United States Patent [19]

Watson

[11] 4,203,709
[45] May 20, 1980

[54] HELICOPTER ROTOR AND BLADE CONNECTION

[75] Inventor: Kenneth Watson, Yeovil, England

[73] Assignee: Westland Aircraft Limited, Yeovil, England

[21] Appl. No.: 940,263

[22] Filed: Sep. 7, 1978

[30] Foreign Application Priority Data

Sep. 7, 1977 [GB] United Kingdom ............ 37426/77

[51] Int. Cl.² ............................................. B64C 27/38
[52] U.S. Cl. ................................. 416/134 A; 416/141
[58] Field of Search ................... 416/114, 108, 134 A, 416/138 A, 140, 141

[56] References Cited

U.S. PATENT DOCUMENTS

| | | | |
|---|---|---|---|
| 2,845,131 | 7/1958 | Laufer | 416/141 X |
| 3,310,119 | 3/1967 | Watson | 416/134 A X |
| 3,606,575 | 9/1971 | Lermusiaux | 416/138 A X |
| 3,700,352 | 10/1972 | Gorndt | 416/134 A |
| 3,807,896 | 4/1974 | Johnson | 416/134 A X |
| 3,967,918 | 7/1976 | Mouille et al. | 416/138 A X |
| 4,012,169 | 3/1977 | Mouille et al. | 416/141 X |
| 4,129,403 | 12/1978 | Watson | 416/141 X |

Primary Examiner—Everette A. Powell, Jr.
Attorney, Agent, or Firm—Larson, Taylor and Hinds

[57] ABSTRACT

This invention relates to helicopter rotors in which the rotor blades are supported by flexure members and resilient means to permit flap and lead/lag movements.

Hitherto such support means have been subjected to centrifugal forces thus complicating their design and requiring compromises such that optimum properties in flap and lead/lag planes have been unattainable.

In this invention, each blade is attached by an individual spindle 19 supported in an elastomeric bearing 21 secured in a hollow rotor hub 12. Arms 26, flexible in a flapping plane, extend from the rotor hub 12 and a bearing 46 at the outer end of each spindle is attached to its associated arms through resilient means 30 to permit lead/lag movement of the spindle 19 relative the arms 26.

In operation, centrifugal loads are transmitted to the hub 12 so that the arms 26 and resilient means 30 can be designed to provide optimum properties in the flap and lead/lag planes. Furthermore, bending of the spindles 19 due to such blade movements significantly reduces corresponding deflections of the elastomeric bearing 21.

16 Claims, 4 Drawing Figures

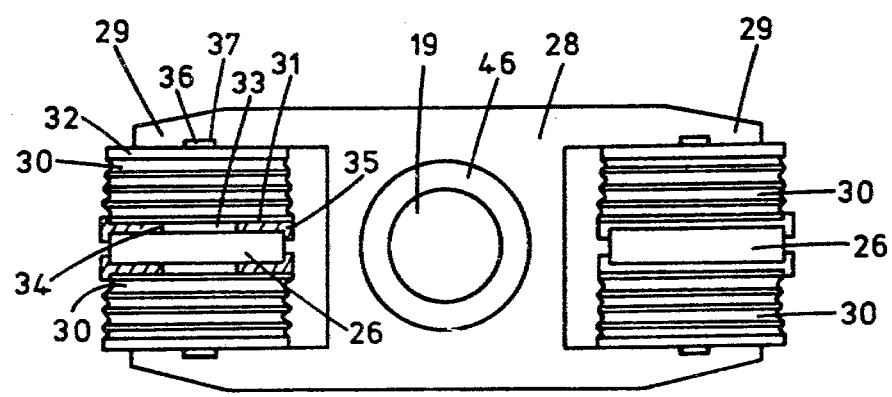
F I G. 4

HELICOPTER ROTOR AND BLADE CONNECTION

DESCRIPTION OF INVENTION

This invention relates to helicopters, and particularly to helicopter rotors.

Research in helicopter rotors generally has recently been directed to simplifying rotor hub components and eliminating mechanical bearings that, in conventional articulated rotors, are used to permit blade flap, lead and lag and feathering movements. This is desirable because centrifugal forces arising from rotation of the rotor blades cause heavy stressing of such bearings, resulting in a high level of servicing and maintenance requirements.

A proposal that has achieved some operational success is the so-called hingeless or semi-rigid rotor in which blade flap and lead and lag movements, and in some cases feathering movements also, are accommodated by flexing of support members that attach the rotor blades to the hub. However, such support members also have to transmit the centrifugal forces encountered during operation, and this has complicated their design and tended to require compromises such that optimum properties in blade flap and lead/lag planes have been unattainable. A further problem with such existing rotors is the undesirable coupling moments resulting from the necessary movements of a flexible support member in two or more of the rotor blade pitch, flap and lead/lag directions of movement. One proposal to overcome this particular problem utilises separate flap and lead/lag flexure members joined end to end: however this arrangement results in a lengthy assembly that may suffer from high drag loads during operation. Also, of course, it does not solve the problem caused by centrifugal loads as previously mentioned.

Further proposals have been made in which the necessary rotor blade movements are accommodated by an elastomeric bearing. High operational loadings cause heavy stressing of such a bearing and tend to reduce its operational life, and also require such a bearing to be rather large and heavy.

Another prior proposal, disclosed in British Patent Specification Ser. No. 1,432,117, is concerned with a helicopter rotor construction that combines flexure members and resilient elastomeric devices. In that rotor, a central flat rotor hub has integral arms manufactured preferably of fibre-reinforced plastics material, and each rotor blade is attached through a yoke member having arms attached to a resilient bearing retained in an aperture through the respective arm of the hub structure. The integral hub and arm structure of this prior rotor is a large component that may be difficult and expensive to manufacture. Further complication may result from the need to design the structure so as to cater in one part for operational centrifugal forces and in another part so as to be flexible in a blade flap plane, as well as the necessity to form a number of apertures through the structure. A failure in any one of the individual arms of the hub structure may necessitate replacement of the entire structure, and the yoke attachment is a further complication that also increases the frontal area which may result in high aerodynamic drag during operation. In operation of this prior rotor, all rotor blade flap and lead/lag movements are transmitted to the resilient bearing which may result in high operational loadings causing heavy stressing of the bearing that may only be accommodated by an unacceptably large and heavy bearing assembly.

The present invention provides a helicopter rotor including a rotor hub arranged for rotation about an axis and a plurality of rotor blades extending radially of that axis, each blade being attached to the outer end of an individual spindle having its inner end so supported in a spindle-support bearing attached to structure of the rotor hub as to permit rotational movement of the spindle about its axis to change the pitch of its associated blade and to transmit centrifugal forces to the hub structure, means for rotating said spindle about its axis, a generally flat arm assembly associated with each spindle, each arm assembly being flexible in a plane perpendicular to the plane of rotation and extending outwardly from the rotor hub to outer end parts spaced-apart from each side of the associated spindle in the plane of rotation of the spindle, and bearing means adjacent the outer end of each spindle and supported by both of the spaced-apart outer end parts of the arm assembly through resilient means arranged to permit movement of the spindle and its associated rotor blade relative the arm assembly in the plane of rotation of the spindle.

Preferably, each arm assembly is manufactured of fibre-reinforced plastics material.

In one form of the invention each arm assembly comprises a pair of arms disposed one on each side of an associated spindle and spaced-apart therefrom, the pair of arms being located in the plane of rotation of the spindle. Adjacent arms of adjacent pairs of arms may be integral, and the arms may be formed integral with the rotor hub structure or may be separate therefrom and attached to the structure for example by bolting through flanges formed on the periphery of the hub structure.

The spindle support bearing may comprise an elastomeric bearing.

The rotor hub may comprise a hollow structure and, conveniently, the spindle support bearing may be located within the hollow structure with the spindle protruding through an aperture in a wall of the structure.

A pitch control lever fixed to the inner end of the spindle may comprise the means for rotating the spindle about its longitudinal axis.

The bearing means adjacent the outer end of the spindle preferably comprises a dry bearing that may be a spherical bearing, and may be mounted on the spindle so as to be slidable longitudinally of the spindle. The bearing may be supported in a bearing housing having outwardly facing U-shaped end portions arranged to straddle outer end parts of the associated arm assembly and spaced-apart from the surfaces thereof. The resilient means may be located in the spacings and, preferably, each resilient means comprises an elastomeric damper unit comprising a stack of alternate layers of elastomer and metal shims oriented in a plane generally coincident with the plane of rotation of the rotor so as to permit movements of the spindle and its associated rotor blade relative the arm assembly in the plane of rotation of the rotor, i.e. the lead/lag plane.

The invention will now be described by way of example only and with reference to the accompanying drawings in which;

FIG. 4 is a part sectioned view in the direction of arrow C on FIG. 2.

Figure 1:
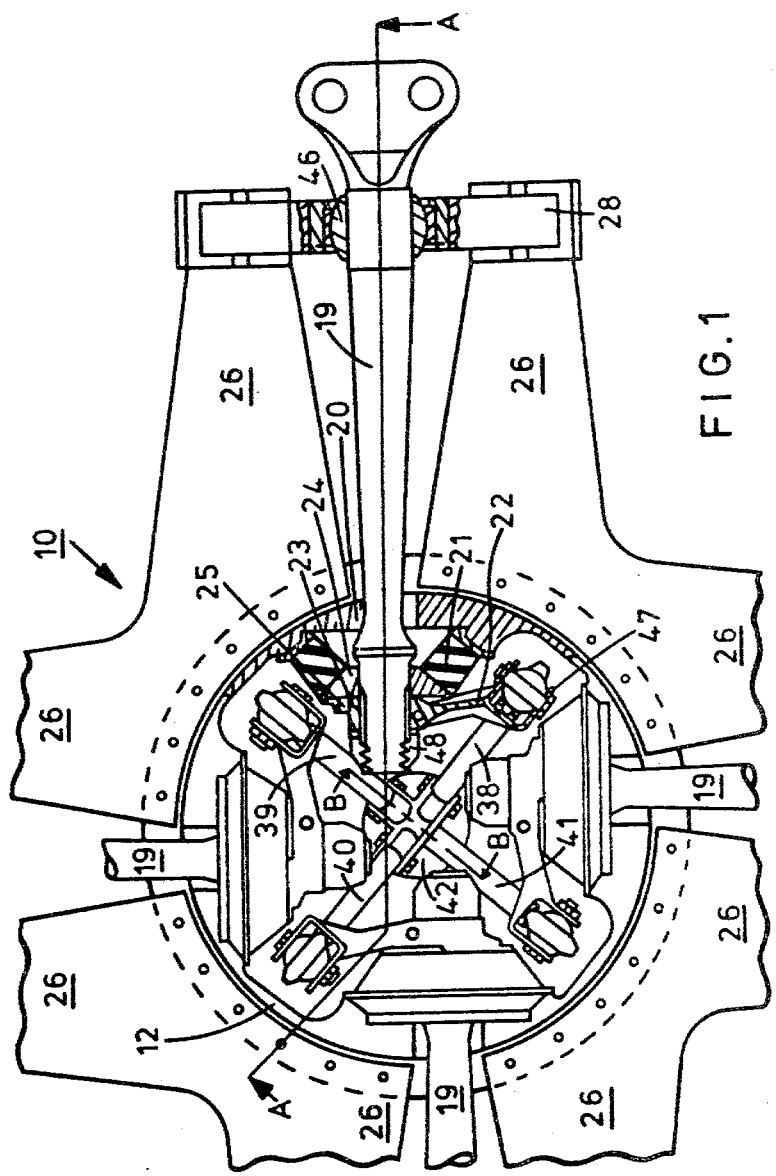
FIG. 1 is a fragmentary part sectioned plan view of a helicopter rotor embodying the invention.
Figure 2:
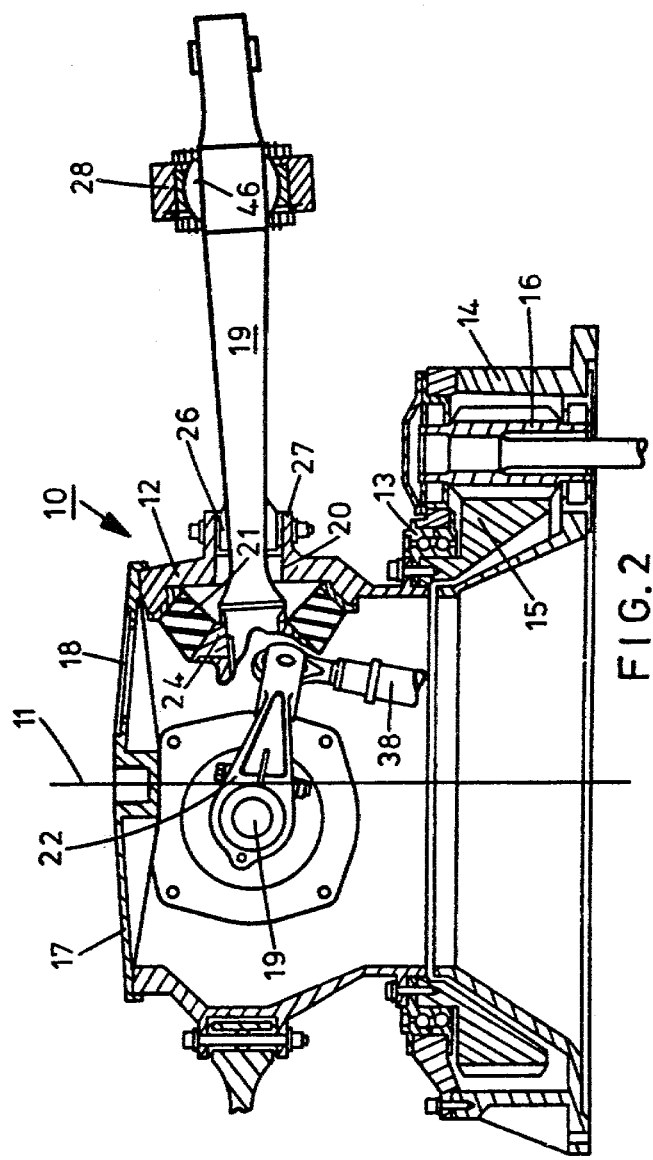
FIG. 2 is a fragmentary part sectioned view taken on line A-A of FIG. 1.

The four-bladed helicopter rotor illustrated in the drawings includes a rotor hub generally indicated at 10 and arranged for rotation about a generally vertical axis 11.

The rotor hub 10 comprises a hollow hub structure 12 supported in a bearing 13 in a gearbox 14. An annular ring gear 15 is bolted to the hub structure 12 and is provided with conformal gear teeth arranged to mesh with a plurality of pinion gears 16 (only one of which is shown) supported in the gearbox and connected to one or more power sources (not shown). An opening in the upper surface of the hub structure 12 is closed by a cover plate 17 provided with four transparent windows 18.

Each of the rotor blades (not shown) is attached to the outer end of an associated generally radially extending, spindle 19 which protrudes through an aperture 20 in the wall of the hub structure 12 into the interior thereof. The inner end of the spindle 19 is supported in a conical elastomeric bearing 21 fixed to the inner surface of the hub structure 12 around the aperture 20.

An individual pitch control lever 22 is fixed to the inner end of each spindle 19, within the rotor hub structure 12, on splines 23, and is also fixed to an inner support 24 of the bearing 21 by a dowel 25. The pitch control lever 22 is retained by a nut threaded onto the inner end of the spindle 19, and extends generally perpendicularly to the longitudinal axis of the spindle 19 for a purpose to be described.

An arm assembly extending outwardly from the rotor hub structure 12 is associated with each of the radially extending spindles 19. In the illustrated embodiment, each arm assembly comprises a pair of generally flat arms 26 constructed of fibre-reinforced plastics material disposed one on each side of the associated spindle 19 in the plane of rotation of the spindle 19 and spaced-apart from the surfaces thereof. The arms 26 are flexible in a plane perpendicular to the plane of rotation, i.e., the rotor blade flapping plane.

Adjacent arms 26 of adjacent pairs of arms are manufactured as an integral assembly and bolted between radially extending flanges 27 formed around the periphery of the hollow hub structure 12.

A dry spherical bearing 46 is located on each spindle 19 slightly inboard of the outer end thereof and so as to be capable of sliding movement on the spindle, and is supported in a bearing housing 28 having outwardly facing U-shaped end portions 29 arranged to straddle the outer ends of the associated pair of arms 26.

Elastomeric damper units 30, each comprising a bonded assembly of alternate layers of elastomer and metal shims bonded to inner and outer metal liners 31 and 32, are located between facing surfaces of the U-shaped portions 29 and of the arms 26. The layers in the units 30 are oriented in the plane of rotation of the rotor. In the illustrated embodiment, each inner liner 31 is provided with a protrusion 33 located in a mating hole 34 in a plate member 35 which has flanged edge portions located on the extremities of the arm 26 and the respective damper unit 30. The outer liner 32 has a protruding laterally extending boss 36 that is located in a mating slot 37 formed in the inner surface of the U-shaped portion 29 of the bearing housing 28.

Each pitch control lever 22 has a bifurcated portion 47 at its outer end which is angled so that the centreline of the four bifurcated portions 47 intersect at a common centre.

Figure 3:
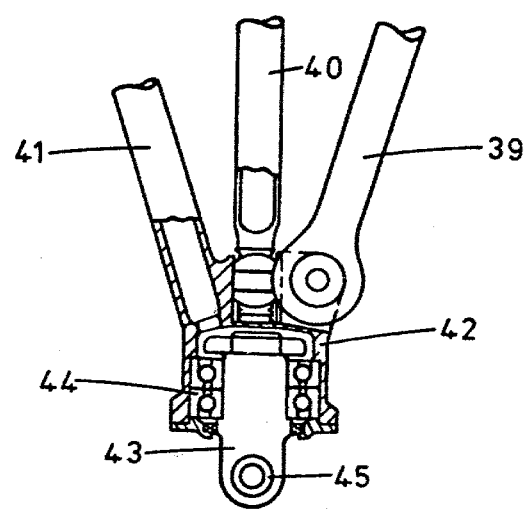
FIG. 3 is a fragmentary part sectioned view taken on line B-B of FIG. 1.

The upper ends of four connecting rods 38, 39, 40 and 41 are attached through ball joints to the bifurcated ends 47 of the pitch control lever 22. The connecting rods 38, 39, 40 and 41 extend downwardly and inwardly through the annular ring gear and have their lower ends attached to a housing 42 (FIGS. 1 and 3) located below a lower surface of the gearbox. The connecting rod 41 is formed integral with the housing 42, whereas connecting rods 38, 39 and 40 are attached by ball joints to flanges formed integral with the housing 42.

The housing 42 includes a hollow lower portion having a downwardly facing lower end. The hollow portion supports a downwardly extending spigot 43 in bearings 44 so that the spigot 43 is capable of rotation relative the housing 42. A lower end of the spigot 43 is provided with a ball joint 45 for attachment to the helicopter flying controls (not shown).

In operation, the pinion gears 16 are rotated through a transmission system by the power source(s) to rotate the annular ring gear 15 and attached hollow hub structure 12 about the axis of rotation 11. The housing 42 rotates about the spigot 43 to permit the connecting rods 38 to 41 to follow this rotation of the rotor.

Vertical movement of the housing 42 (FIG. 3) by the helicopter controls is transmitted through the control rods 38, 39, 40 and 41 to each pitch control lever 22 to rotate the spindles 19 about their respective axes, this rotation being permitted by the elastomeric bearings 21 and serving to adjust the collective pitch setting of rotor blades attached at outer ends of the spindles 19. A lateral movement imparted to the housing 42 in any desired direction by the helicopter flying controls causes varying degrees of rotation of the spindles 19 as the rotor hub 10 is rotated about axis 11, to cause cyclic pitch changes of the rotor blades thereby imparting desired control movements to the helicopter.

The rigid attachment of the lower end of control rod 41 to the housing 42 serves to stabilise the control system, and lateral shear forces caused by movements of the rotating rotor blades are reacted at the pitch control levers 22.

Apart from facilitating blade pitch change movements as above described, the elastomeric bearings 21 serve also to transmit centrifugal forces from the rotating rotor blades to the hollow rotor hub structure 12 via the spindles 19. Blade flapping movements due to changes in collective or cyclic pitch are accommodated by resilient flexing of the support arms 26, and rotor blade lead and lag movements are accommodated by shear movements in the elastomer layers in elastomeric damper units 30.

The dry spherical bearings 46 serve to isolate blade pitch changes from lead/lag movement, their ability to slide longitudinally of the spindles 19 serving to isolate blade pitch changes from flap movements.

Thus, in operation of the illustrated hingeless rotor, the flexible support arms 26 are not subjected to centrifugal forces and can, therefore, be designed to rovide optimum stiffness in the blade flap plane totally independent of blade centrifugal force considerations. Similarly, the elastomeric damper units 30 are not subjected to centrifugal forces and can also, therefore, be designed to provide optimum requirements in the lead/lag plane by selection of elastomer having suitable hysteresis to provide, for example, any desired degree of damping.

This isolation of pitch, flap and lead/lag movements respectively also substantially eliminates undesirable pitch/flap and pitch/lag coupling phenomena during operation.

A further feature of the illustrated rotor is that, during operation, rotor blade flap and lead/lag movements result in bending of the spindles 19 which serves to prevent at least a proportion of such movements from being transmitted to the elastomeric bearings 21. In one particular embodiment, substantially all of the blade lead/lag movement is taken up by bending of the spindles 19 so that no in-plane movements are transmitted to the bearings 21, and approximately one half of any blade flap movement is taken up by bending of the spindles 19 so that about one half only of all blade flap movements are transmitted to the bearings 21. Due to their circular cross-sectional shape, the spindles 19 are equally stiff in the flap and lead/lag planes, and their stiffness is dictated by the deflection requirements of a particular rotor in the lead/lag plane. The actual proportion of blade flap and lead/lag movements permitted by bending of the spindles 19 and deflection of the bearings 21 respectively will depend, in a particular rotor, on the relative stiffnesses of the spindles 19 and the bearings 21 and, in the flap plane, on the location of the flexural centre of the arms 26. However, it is considered that the arrangement of the present invention will, in most cases, permit deflection of the bearings 21 due to blade flap and lead/lag movements to be reduced by a factor of at least two compared with rotors in which the blades are connected directly to elastomeric bearings.

Therefore, because the elastomeric bearings 21 are required to provide substantially only for blade pitch change movements, being subject to only minor deflection by flapping and lead/lag movements, they can be of relatively small size, readily accommodated in the hub.

The arrangement of each spindle 19 between a pair of spaced-apart support arms 26 serves to reduce the overall radial length of the rotor blade support structure and to minimise the profile presented in the direction of rotation, both features serving to reduce aerodynamic drag during operation.

Since the flexible arms 26 of the illustrated rotor are relieved of all operational centrifugal loads, their size is minimised and manufacture is simplified and inexpensive. Furthermore, the construction ensures that replacement of individual arms 26 is readily accomplished.

The illustrated control system requires no complex mechanical components such as swash plates or internal supports within the rotor drive shaft thus being relatively inexpensive to manufacture and also of light weight and requiring minimal maintenance and servicing activity.

Furthermore, all the components of the control system are located within the hollow rotor hub and the drive shaft so that any possibility of damage by outside influences is eliminated. When utilised in combination with an annular final drive gear 15 as in the illustrated embodiment, the rotor of the invention enables the assembly comprising the rotor and gearbox to be of very small overall height, an important advantage in the design of helicopters required not to exceed a given overall height in that it permits achievement of the maximum cabin height dimension.

It will be understood that modifications can be made without departing from the scope of the invention as defined in the appended claims. For example, the elastomeric bearings 21 may be of any suitable configuration, e.g. part-spherical, instead of being conical as disclosed. The support arms 26 may be separately formed and may be individually attached to the hollow hub structure 12, or the arms 26 may be formed integral with the hollow hub structure 12. Each of the connecting rods 38, 39, 40 and 41 may be formed as two parts pivotally interconnected at an intermediate pivotal connection to the free end of an arm the other end of which is pivotally attached to the interior surface of the rotor hub structure 12. Instead of lying entirely in the plane of the spindles 19 as in the illustrated embodiment the flexible arms 26 associated with each spindle 19 may slope upwardly from their outer attachment to the bearing housings 28 for attachment to an upper surface of the hub structure 12. In such an embodiment, the inboard parts of each arm of a pair may, conveniently, be joined to constitute an integral assembly having generally U-shaped outer end parts straddling the outer end of the associated spindle 19 and providing the attachment to the bearing housings 28. Such an arrangement, accompanied by suitable apertures in the wall of the hub structure 12, provides an alternative to the access provided by the cover 18 of the illustrated embodiment and will facilitate assembly and servicing such as the adjustment of control rods 38, 39, 40 and 41.

Although the invention has been described in relation to a four-bladed rotor, it will be understood that it is applicable to a helicopter having any number of rotor blades.

What I claim is:

1. A helicopter rotor including a rotor hub arranged for rotation about an axis and a plurality of rotor blades extending radially of that axis, each blade being attached to the outer end of an individual spindle having its inner end so supported in a spindle-support bearing attached to structure of the rotor hub as to permit rotational movement of the spindle about its axis to change the pitch of its associated blade and to transmit centrifugal forces to the hub structure, means for rotating said spindle about its axis, a generally flat arm assembly associated with each said spindle, each arm assembly being flexible in a plane perpendicular to the plane of rotation and extending outwardly from said rotor hub to outer end parts spaced-apart from each side of said associated spindle in the plane of rotation of said spindle, and bearing means adjacent the outer end of each spindle and supported by both of said spaced-apart outer end parts of said arm assembly through resilient means arranged to permit movement of the spindle and its associated rotor blade relative the arm assembly in the plane of rotation of the spindle.

2. A helicopter rotor as claimed in claim 1, wherein each said arm assembly is manufactured of fibre-reinforced plastics material.

3. A helicopter rotor as claimed in claim 1, wherein each said arm assembly comprises a pair of arms disposed one on each side of an associated said spindle and spaced-apart therefrom, said pair of arms being located in the plane of rotation of said spindle.

4. A helicopter rotor as claimed in claim 3, wherein adjacent arms of adjacent pairs of arms are integral with one another.

5. A helicopter rotor as claimed in claim 1, wherein said arm assemblies are integral with the rotor hub structure.

6. A helicopter rotor as claimed in claim 1, wherein said spindle-support bearing is an elastomeric bearing.

7. A helicopter rotor as claimed in claim 1, wherein said rotor hub is a hollow structure and said spindle-support bearing is located within the hollow structure and said spindle protrudes through an aperture in the structure.

8. A helicopter rotor as claimed in claim 1, wherein said means for rotating said spindle includes a pitch control lever fixed to the inner end of the spindle.

9. A helicopter rotor as claimed in claim 1, wherein said bearing means adjacent to the outer end of the spindle comprises a dry bearing mounted so as to be slidable longitudinally of the spindle.

10. A helicopter rotor as claimed in claim 9, wherein said dry bearing is a spherical bearing.

11. A helicopter rotor as claimed in claim 9, wherein said bearing is supported in a bearing housing having outwardly facing U-shaped end portions arranged to straddle the outer end parts of the associated arm assembly, and being spaced-apart from the surfaces thereof, said resilient means being located in said spacings.

12. A helicopter rotor as claimed in claim 11, wherein said resilient means comprises an elastomeric damper unit comprising a stack of alternate layers of elastomer and metal shims oriented in a plane generally coincident with the plane of rotation of the rotor.

13. A helicopter rotor as claimed in claim 12, wherein each damper unit stack has inner and outer metal liners bonded thereto and arranged for positive location to the facing surfaces of the arm assembly and bearing housing respectively.

14. A helicopter rotor as claimed in claim 13, wherein each said inner liner has a protrusion located in a mating aperture in a plate member, said plate member having flanged edge portions located on the lateral extremities of the arm assembly and the respective damper unit.

15. A helicopter rotor as claimed in claim 13, wherein each said outer liner has a protruding laterally extending boss located in a mating slot formed in the inner surface of each U-shaped portion of the bearing housing.

16. A helicopter having a rotor system including a rotor hub arranged for rotation about a generally vertical axis and a plurality of rotor blades extending radially of that axis, each blade being attached to the outer end of an individual spindle having its inner end so supported in a spindle-support bearing attached to structure of the rotor hub as to permit rotational movement of the spindle about its axis to change the pitch of its associated blade and to transmit centrifugal forces to the hub structure, means for rotating said spindle about its axis, a generally flat arm assembly associated with each said spindle, each arm assembly being flexible in a plane perpendicular to the plane of rotation and extending outwardly from said rotor hub to outer end parts spaced-apart from each side of said associated spindle in the plane of rotation of said spindle, and bearing means adjacent the outer end of each spindle and supported by both of said spaced-apart outer end parts of said arm assembly through resilient means arranged to permit movement of the spindle and its associated rotor blade relative the arm assembly in the plane of rotation of the spindle.

* * * * *